(12) United States Patent
Gharachorloo et al.

(10) Patent No.: US 6,412,056 B1
(45) Date of Patent: *Jun. 25, 2002

(54) EXTENDED TRANSLATION LOOKASIDE BUFFER WITH FINE-GRAIN STATE BITS

(75) Inventors: Kourosh Gharachorloo, Menlo Park; Daniel J. Scales, Palo Alto, both of CA (US)

(73) Assignee: Compac Information Technologies Group, LP, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/942,337

(22) Filed: Oct. 1, 1997

(51) Int. Cl.⁷ ............................................. G06F 12/10
(52) U.S. Cl. ................ 711/202; 711/203; 711/206; 711/207
(58) Field of Search ...................... 74/202, 203, 205, 74/206, 207, 208, 209

(56) References Cited

U.S. PATENT DOCUMENTS

| | | | |
|---|---|---|---|
| 4,589,092 A | 5/1986 | Matlick | 364/900 |
| 4,638,426 A | 1/1987 | Chang et al. | 364/200 |
| 4,937,736 A | 6/1990 | Chang et al. | 364/200 |
| 5,341,483 A * | 8/1994 | Frank et al. | 711/206 |
| 5,426,752 A * | 6/1995 | Takahasi et al. | 711/209 |
| 5,440,710 A * | 8/1995 | Ritcher et al. | 711/207 |
| 5,528,761 A | 6/1996 | Ooba et al. | 395/200.14 |
| 5,555,387 A * | 9/1996 | Branstad et al. | 711/208 |
| 5,586,283 A * | 12/1996 | Lopez-Aguado et al. | 711/206 |
| 5,598,553 A * | 1/1997 | Ritcher et al. | 711/209 |
| 5,652,853 A * | 7/1997 | Duvalsaint et al. | 711/203 |
| 5,652,872 A * | 7/1997 | Ritcher et al. | 711/207 |
| 5,895,501 A * | 4/1999 | Smith | 711/207 |
| 5,897,664 A * | 4/1999 | Nesheim et al. | 711/206 |

OTHER PUBLICATIONS

Listl, A. Efficient Buffer Management in Parallel Relational Database. Translation of 1996 German Doctoral dissertation, 2001.*

Listl, A Effiziente Pufferverwaltung in parallelen rationalen Datenbanksystemen. Ph.D. Thesis, Technical University of Munich, Germany, 1996 (in German).*

Milenkovic, M. Microprocessor Memory Management Units. IEEE Micro 1990.*

Listl, A. Using Subpages for Cache Coherency Control in Parallel Database Systems. Technical Report SFB342/06/94 A, Technische Universitat Munchen, 1994.*

Khalidi et al.. Virtual Memory Support for Multiple Page Sizes. In 4th Int'l Workshop on Workstation Operating Systems, Napa, California, Oct. 1993. IEEE.*

Listl et al. Performance Gains Using Subpages for Cache Coherency Control. Eight International Workshop on Database and Expert Systems Applications (DEXA '97) Sep. 1–5, 1997: 754–760.*

Jamrozik et al. Reducing Network Latency Using Subpages in a Global Memory Environment. Proceedings of the Seventh ACM Conference on Architectural Support for Programming Languages and Operating Systems, Oct. 1996 [Online] http://bauhaus.cs.washingto.*

(List continued on next page.)

Primary Examiner—Do Hyun Yoo
Assistant Examiner—Yamir Encarnacion
(74) Attorney, Agent, or Firm—Pennie & Edmonds LLP (57) ABSTRACT

A software distributed shared memory system includes a translation lookaside buffer extended to include fine-grain memory block-state bits associated with each block of information within a page stored in memory. The block-state bits provide multiple block states for each block. The block-state bits are used to check the state of each block, thereby alleviating the need for software checks and reducing checking overheads associated therewith.

17 Claims, 5 Drawing Sheets

| 322 | PB₁ | VA₁ | PA₁ | BB0₁ | BB1₁ | . . . | BB0ₙ | BB1ₙ |
|---|---|---|---|---|---|---|---|---|
| 324 | PB₂ | VA₂ | PA₂ | BB0₁ | BB1₁ | . . . | BB0ₙ | BB1ₙ |
| | . | . | . | . | . | . . . | . | . |
| | . | . | . | . | . | . . . | . | . |
| | . | . | . | . | . | . . . | . | . |
| | . | . | . | . | . | . . . | . | . |
| 326 | PBₘ | VAₘ | PAₘ | BB0₁ | BB1₁ | . . . | BB0ₙ | BB1ₙ |

309

OTHER PUBLICATIONS

Chang et al. 801 storage: Architecture and programming. ACM Transactions on Computer Systems, 6(1), Feb. 1988.*

Erlichson, et al., SoftFLASH: Analyzing the Performance of Clustered Distributed Virtual Shared Memory, ASPLOS '96 10/96 MA, USA, pp. 1–11.

Schoinas, et al., Fine–grain Access Control for Distributed Shared Memory, ASPLOS VI, Oct. 1991.

Thekkath, et al., Shasta: A Low Overhead, Software—Only Approach for Supporting Fine–Grain Shared Memory, Proceedings of the Seventh Intl. Conf. on Architectural Support for Programming Languages and Operating Systems, Mar. 8, 1986, pp. 1–17, Memory.

Yeung, et al., MGS: A Multigrain Shared Memory System Laboratory for Computer Science, Massachusetts Instituate of Technology, Proceedings of the 23rd Annual International Symposium on Computer Architecture, May 1996, pp. 1–11.

* cited by examiner

EXTENDED TRANSLATION LOOKASIDE BUFFER WITH FINE-GRAIN STATE BITS

CROSS REFERENCE TO RELATED APPLICATIONS

U.S. Pat. No. 5,761,729, filed Jul. 17, 1996, entitled VALIDATION CHECKING OF SHARED MEMORY ACCESSES of common assignee herewith, incorporated herein by reference.

U.S. Pat. No. 5,758,183, filed Jul. 17, 1996, entitled INSTRUMENTED MEMORY SHARING of common assignee herewith, incorporated herein by reference.

U.S. Pat. No. 5,802,585, filed Jul. 17, 1996, entitled BATCHED CHECKING OF SHARED MEMORY ACCESSES of common assignee herewith, incorporated herein by reference.

U.S. Pat. No. 5,933,598, filed Jul. 17, 1996, entitled VARIABLE-GRAINED MEMORY SHARING of common assignee herewith, incorporated herein by reference.

U.S. Pat. No. 5,787,480, filed Jul. 17, 1996, entitled LOCK-UP FREE DATA SHARING of common assignee herewith, incorporated herein by reference.

U.S. Pat. No. 5,950,228, filed Feb. 3, 1997, entitled VARIABLE-GRAINED MEMORY SHARING FOR CLUSTERS OF SYMMETRIC MULTI-PROCESSORS of common assignee herewith, incorporated herein by reference.

FIELD OF THE INVENTION

The present invention generally relates to computer systems and methods and, more particularly, to computer systems and methods for memory state checking.

BACKGROUND OF THE INVENTION

Distributed computer systems typically comprise multiple computers connected to each other by a communications network. In some distributed computer systems, the networked computers can concurrently access shared information, such as data and instructions. Such systems are sometimes known as parallel computers. If a large number of computers are networked, the distributed system is considered to be "massively" parallel. As an advantage, massively parallel computers can solve complex computational problems in a reasonable amount of time.

In such systems, the memories of the computers are collectively known as a distributed shared memory. It is a problem to ensure that the information stored in the distributed shared memory are accessed in a coherent manner. Coherency, in part, means that only one computer can modify any part of the data at any one time, otherwise the state of the information would be nondeterministic.

Figure 1:
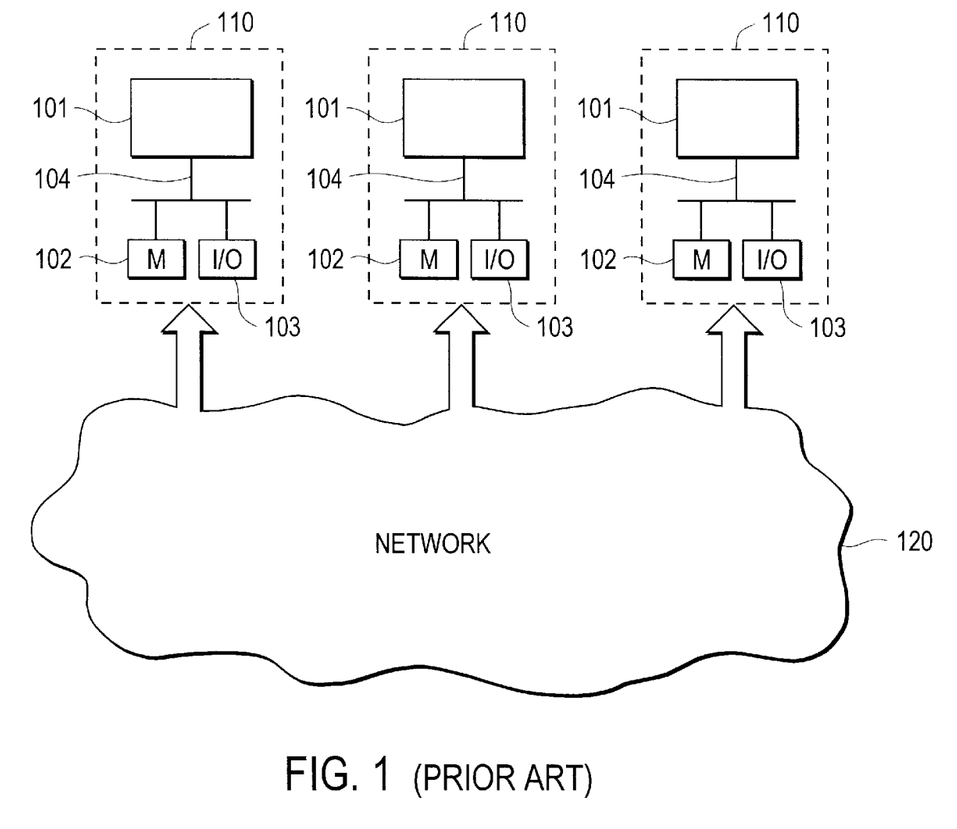
FIG. 1 shows a prior art distributed shared memory system.

FIG. 1 shows a typical distributed shared memory system 100 including a plurality of computers 110. Each computer 110 includes a uniprocessor 101, a memory 102, and input/output (I/O) interfaces 103 connected to each other by a bus 104. The computers are connected to each other by a network 120. Network 120 may be a local area network, a wide area network, to or a nationwide or international data transmission network, or the like, such as the Internet. Here, the memories 102 of the computers 110 constitute the shared memory.

Some distributed computer systems maintain data coherency using specialized control hardware. The control hardware may require modifications to the components of the system such as the processors, their caches, memories, buses, and the network. In many cases, the individual computers may need to be identical or similar in design, e.g., homogeneous.

As a result, hardware controlled shared memories are generally costly to implement. In addition, such systems may be difficult to scale. Scaling means that the same design can be used to conveniently build smaller or larger systems.

More recently, shared memory distributed systems have been configured using conventional workstations or PCS (Personal Communication System) connected by a conventional network as a heterogeneous distributed system. Shared memory distributed systems have also been configured as a cluster of symmetric multiprocessors (SMP).

In most existing distributed shared memory systems, logic of the virtual memory (paging) hardware typically signals if a process is attempting to access shared information which is not stored in the memory of the local SMP or local computer on which the process is executing. In the case where the information is not available locally, the functions of the page fault handlers are replaced by software routines which communicate messages with processes on remote processors.

With this approach, the main problem is that data coherency can only be provided at large (coarse) sized quantities, because typical virtual memory page units are 4K or 8K bytes. This size may be inconsistent with the much smaller sized data units accessed by many processes, for example, 32, 64 or 128 bytes. Having coarse page sized granularity increases network traffic and can degrade system performance.

In existing software distributed shared memory systems, fine grain information access and coherency control are typically provided by software-implemented message passing protocols. The protocols define how fixed size information blocks and coherency control information is communicated over the network. Procedures which activate the protocols can be called by "miss check code." The miss check code is added to the programs by an automated process.

States of the shared data can be maintained in state tables stored in memories of each processor or workstation. Prior to executing an access instruction, e.g., a load or a store instruction, the state table is examined by the miss check code to determine if the access is valid. If the access is valid, then the access instruction can execute, otherwise the protocols define the actions to be taken before the access instruction is executed. The actions can be performed by protocol functions called by the miss handling code.

The calls to the miss handling code can be inserted into the programs before every access instruction by an automated process known as instrumentation. Instrumentation can be performed on executable images of the programs.

Figure 2:
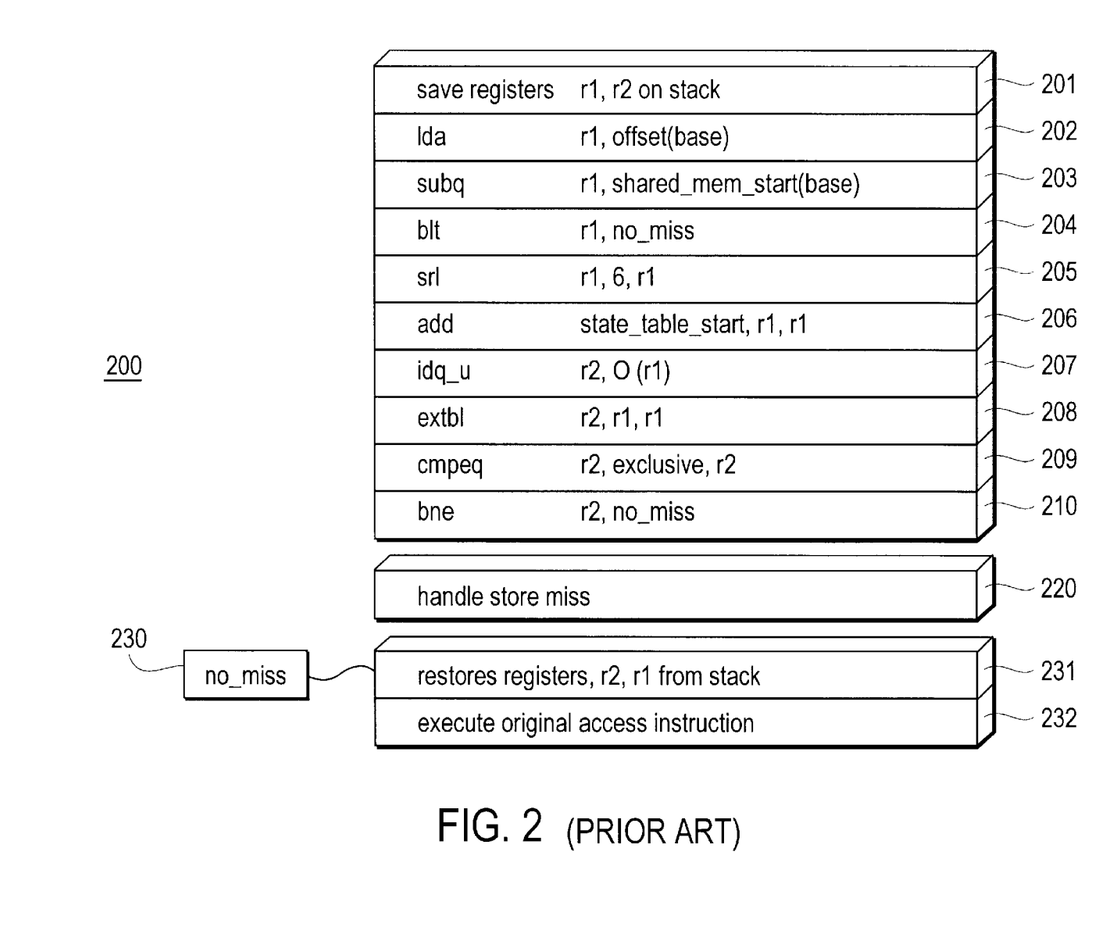
FIG. 2 shows a prior art miss check code for fixed size information blocks.

FIG. 2 shows an example miss check code 200 for a program which is to execute on a RISC (Reduced Instruction Set Computer) type of computer. In this implementation, all of the memories of the distributed computers are partitioned so that the addresses of the shared memory are always higher than the addresses of the non-shared memory. In addition, the implementation maintains coherency state information for fixed size quantities of information, for example, "blocks" or "lines." Obviously, the fixed size or granularity of the blocks used by any particular application can be set to be smaller or larger than 128 bytes. Partitioning the addresses of shared memory, and using fixed blocks simplifies the miss check code, thereby reducing overhead. First, in step 201, the content of any registers that are going to be used by the miss check code 200 on a stack is saved. In step 202, the target address of the access instruction, using the offset and base as specified in the operands of the instruction is determined. The access instruction in this example is a store. A store access is valid if the processor modifying the data stored at the target address has exclusive ownership of the data.

In steps 203–204, a determination as to whether the target address is in non-shared memory is made. If the target address is in the non-shared memory, the rest of miss check code 200 is skipped, the registers are restored in step 231, and the memory access instruction is executed in step 232. In this case, the overhead is about seven instructions.

Otherwise, if the target address is in shared memory, then in step 205, the index of the line including the target address is determined. If the size of the block is an integer power of two, for example 128 bytes, the block index can be computed using a simple shift instruction.

As shown in step 206, the block index can be used to reference the corresponding entry of the state table. In the exemplary implementation, each entry in the state table is a byte. Obviously, if the number of different states is small, for example, the states can be indicated with two bits, then the size of the state table can be reduced. However, by making the entries smaller, it becomes more difficult to extract state information, since most computers do not conveniently deal with addressing schemes and data operations which are less than eight bits.

In step 207–208, the table entry is loaded, and in step 209, a determination is made as to whether the state of the block containing the target address is, for example, EXCLUSIVE. If the state of the block containing the target address is EXCLUSIVE, for example, the method skips step 220, and the registers from the stack are restored in step 231. In this case, the overhead is about 13 instructions. Otherwise, the miss handling code is called to gain exclusive control over the data in step 220.

As indicated above, code is inserted in the application executable to intercept each load and store of information to see if the information is available locally, is read only or is readable and writable. Numerous techniques have been employed to reduce the runtime overhead of these software checks as much as possible. Nonetheless, such systems still experience a 10–40% overhead due to these software state checks.

Thus, what is needed is a simple hardware support in a software distributed shared memory system that effectively eliminates the need for software state checks to reduce the associated overhead.

Software distributed shared memory systems have been previously proposed which provide hardware state checks at the granularity of a physical page such as 8K bytes by using one or more state bits associated with the page in a translation lookaside buffer (TLB). However, such systems do not provide state checks at a granularity less than a page such as block or lines or one or more state bits associated with the blocks or lines.

Non-distributed shared memory computer systems have also been previously proposed which provide finer grain protection or state checks by extending a TLB entry to have a single bit per 128-byte line in each page (i.e., 32 bits for a 4K byte page). However, these bits are primarily used for locking data at a finer granularity in database applications. Also, a single state bit per 128 bytes is not sufficient to efficiently provide read/write protection in applications such as software distributed shared memory systems. An example of such a computer system is described in U.S. Pat. No. 4,638,426, Virtual Memory Address Translation Mechanism with Controlled Data Persistence, by Albert Chang et al.

This patent, along with U.S. Pat. No. 4,589,092, Data Buffer Having Separate Lock Bit Storage Array, by Richard E. Matick, and U.S. Pat. No. 4,937,736, Memory Controller for Protected Memory with Automatic Access Granting Capability, by Albert Chang et al. describe a set of lock bits that control access to sub-regions of a page for locking in transaction-based programs.

U.S. Pat. No. 5,440,710, Emulation of Segment Bounds Checking Using Paging with Sub-page Validity, by David E. Richter et al., discloses the use of valid bits within a page. While the above mentioned patents primarily discuss the use of the bits as lock bits, this patent uses bits in the TLB to determine whether a region of data is valid or not to emulate segment bounds on hardware that does not directly support segments.

OBJECTS OF THE INVENTION

Accordingly, one object of the present invention is to reduce application executable runtime overhead associated with software state checks in a software distributed shared memory system.

It is another object of the invention to eliminate software state checks in software distributed shared memory systems.

It is yet another object of the invention to provide a method for checking block states for each block within a page of information.

It is yet another object of the invention to provide a method for checking block states for each block within a page of information when a request to access information in such blocks in physical memory is made.

It is yet another object of the invention to provide multi-granularity state checking such as fine grain block checking and coarse grain page checking.

SUMMARY OF THE INVENTION AND ADVANTAGES

Accordingly, the present invention provides a memory apparatus comprising memory for storing at least one page of information. For example, memory may include random access memory (RAM), dynamic random access memory (DRAM), or the like, and the information may include a fixed or variable number of bytes of data or instructions. The page of information is divided into at least two blocks of information. At least two block-state bits corresponding to each block are operably associated with the memory for providing at least three block states for each block. The block-state bits may be used to check or monitor the state of a block of memory or control access to a block of memory. The block states may, for example, indicate whether a block of information is present in memory, whether a block is only readable, whether a block is readable and writable, or whether a block has been previously accessed. A table is associated with the memory for containing addresses corresponding to the information stored in the memory. For example, the table may be a second memory such as a translation lookaside buffer. The block-state bits may be associated with or included in the table.

In accordance with one aspect of the invention, memory states are checked by maintaining, for example, storing, formatting or re-storing at least one page of information which is divided into at least two blocks of information in a memory, and maintaining at least two block-state bits corresponding to each block for providing at least three block states for each block. The block-state bits are read to check the states for each block.

According to another aspect of the invention, an information processing system having at least one processor and memory for storing at least one page of information is provided. The page of information is divided into at least two blocks of information. A communication link, such as a bus, operably couples the processor and the memory. At least two block-state bits corresponding to each block are operably associated with the memory for providing at least three block states for each block.

In yet another aspect of the invention, the above described inventive aspects are implemented in a distributed shared memory system comprising a first processor associated with a first memory and a second processor associated with a second memory. In such a system, the first and second processors share access to information stored in the first and second memories. The first processor and first memory may be included within a first workstation, and the second processor and second memory may be included in a second workstation. Or the first processor may be included in a first symmetric multiprocessor, and the second processor may be included in a second symmetric multiprocessor.

The present invention provides the advantage of simplifying complicated optimization protocols used to reduce overhead caused by inserted software state checks in software distributed shared memory systems by providing hardware bits which eliminate the need for the software checks.

The present invention also provides the advantage of leveraging exception and fast trap mechanisms already present for handling TLB faults in most computer systems.

BRIEF DESCRIPTION OF THE DRAWINGS

Other objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

DETAILED DESCRIPTION OF A PREFERRED EMBODIMENT OF THE INVENTION

Figure 3:
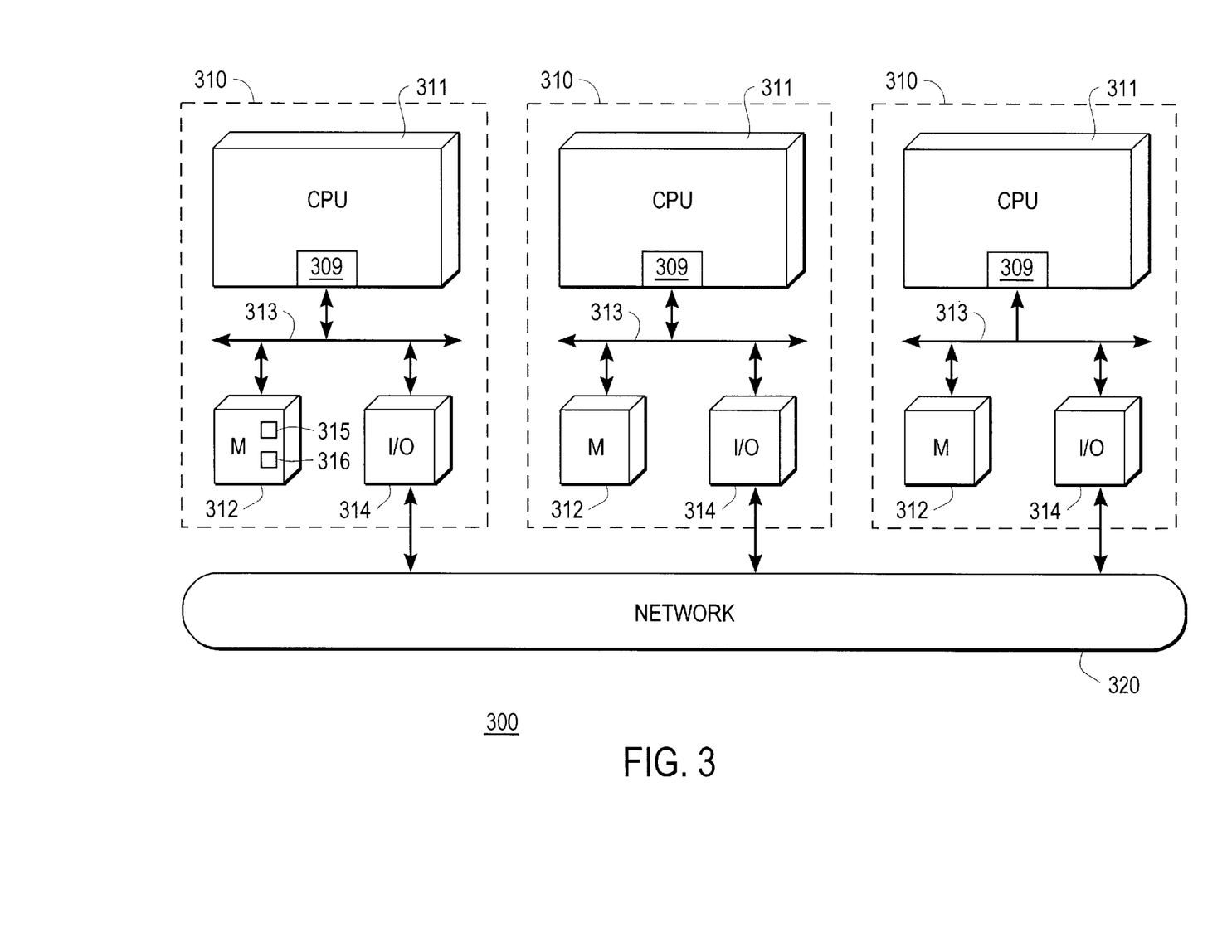
FIG. 3 is a block diagram of a distributed memory system according to a preferred embodiment of the present invention.

With reference now to the figures and, in particular, with reference to FIG. 3, there is shown a distributed computer system 300 according to a preferred embodiment of the invention. The system 300 includes a plurality of workstations 310 connected to each other by a network 320. Each workstation 310 can include one or more processors (CPU) 311, memories (M) 312, and input/output interfaces (I/O) 314 connected to each other by a bus 313.

The workstations 310 can include a homogeneous or heterogenous set of processors which may include personal computers. The processors 311 can be CISC or RISC. The processors 311 include hardware caches 309, such as data caches, instruction caches, page tables, translation lookaside buffers or the like, to store frequently accessed data and instructions.

The memories 312 can be dynamic random access memories (DRAM). The memories 312 store pages of information, such as instructions or programs 315 and data structures 316. The pages of information are further divided into blocks of information. For example, a page may be 8K bytes of information, while a block may be only 128 bytes of information. Some of the addresses of the memories 312 can be designated as a single set of shared virtual addresses. Some of the data structures can include shared data. Shared data can be accessed by programs executing on any of the processors 311 using the virtual addresses. The buses 313 connect the components of the workstations using data, address, and control lines. The network 320 uses network protocols for communicating messages among the workstations 310, for example, asynchronous transfer mode (ATM) or FDDI protocols.

During operation of the system 300, instructions of the programs 315 are executed by the processors 311. The instructions can access the data structures 316 using load and store instructions. Typically, the accessed data are first stored in the caches 309 and then in processor registers while manipulated by the processors. It is desired that any of the programs 315 executing on any of the processors 311 can access any of the shared data structures 316 stored in any of the memories 312.

Figure 4:
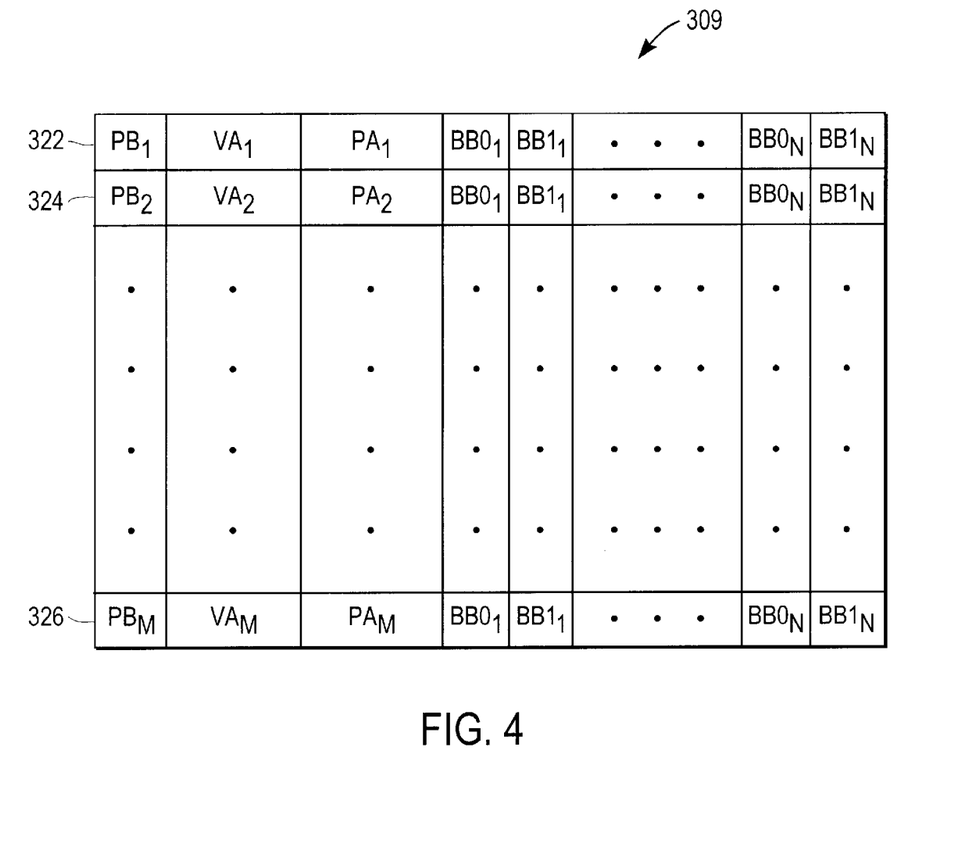
FIG. 4 is a graphical representation of a TLB according to the present invention.

Referring now to FIG. 4, a page table or TLB 309 operably associated with memories 312 according to the present invention is shown. Although TLB 309 is preferably located in processor 311, TLB 309 may be located anywhere in system 300 such as memories 312. TLB 309 contains one entry 322, 324, . . . , 326, corresponding to each page of information stored in memories 312. Each entry 322, 324, . . . , 326 contains a virtual memory address ($VA_1$, $VA_2$, . . . $VA_M$) and a physical memory address ($PA_1$, $PA_2$, . . . $PA_M$) corresponding to the page or pages of information stored in memories 312. The operation of TLBs is well known to those skilled in the art and therefore will not be described in detail. TLB 309 converts or translates virtual memory addresses received from processor 311 into physical memory address corresponding to pages of information stored in memories 312 so that the pages and blocks of information may be located and accessed. M represents the number of entries in TLB 309 corresponding to the number of page translations, i.e., virtual memory address/physical memory address pairs TLB 309 can hold. TLB 309 includes one or more page-state bits ($PB_1$, $PB_2$, . . . $PB_M$) for providing one or more page states for each page of information for coarse grain page checking. For example, page-state bits $PB_1$, $PB_2$, . . . $PB_M$ may provide a first page state for indicating whether a page is valid or active (e.g., whether a page is located locally, in memory associated with a first processor 311, or remotely, in a memory associated with another processor 311), a second page state for indicating whether a page is writable, a third page state for indicating whether a page is readable, a fourth page state for indicating whether a page has already been accessed, and a fifth page state for indicating whether instructions in a page are executable.

According to the invention, TLB 309 also includes at least two block-state bits $BB0_1$, $BB1_1$; $BB0_2$, $BB1_2$; ...; $BB0_N$, $BB1_N$ corresponding to each block within each page represented by each entry 322, 324, ..., 326 for providing at least three block states for each block for fine grain block checking. N is equal to page size divided by block size or:

$$N = \frac{\text{page size}}{\text{block size}}$$

For a page size of 8K bytes having a block size of at least 128 bytes, 128 block-state bits will be needed. The minimum number of block-state bits needed to provide at least three block states is determined by the following formula:

2 bits*N

It will be appreciated that more than two block-state bits corresponding to each block can be included to provide additional block states. It will also be appreciated that entries 322, 324, 326 may not correspond to pages of the same size. For example, some entries may refer to 8K pages, and others may refer to 64K pages . . . in a dynamic fashion. Nevertheless, a uniform design for the extended TLB will have the same number of block-state bits for every entry. Therefore, the effective block size per entry at which fine-grain checks are done is:

(page size for entry)/(2×block-state bits per entry)

Block-state bits $BB0_1$, $BB1_1$; $BB0_2$, $BB1_2$; ...; $BB0_N$, $BB1_N$ provide at least a first block state for indicating whether a block is valid or active (e.g., whether a block is located locally, in a memory associated with a first processor 311, or remotely, in a memory associated with another processor 311), a second block state for indicating whether a block is read only, i.e., readable but not writable, and a third block state for indicating whether a block is readable and writable. Other block states may be provided, such as a fourth block state for indicating whether a block has already been accessed and a fifth block state for indicating whether instructions in a block are executable.

TLB 309 provides hardware support for fine grain state checking. As indicated previously, page-state bits PB indicate whether the fine grain block-state bits are "active" for a given page. If the block-state bits are active, then as part of the TLB lookup there is a check of the corresponding block-state bits. An exception/fault results if the block state is invalid on a read access, or invalid or read-only on a write access. This extra functionality does not necessarily increase the TLB access time since it can be implemented separately from the address translation array. For example, address translation can be performed and the check of block-state bits can be piped to appear just after address translation, resulting in an exception/fault for that memory operation.

The above-described hardware support is preferably used to support fine grain sharing in a software DSM. However, there are numerous other applications that can benefit from this fine grain support for state checking. With respect to software DSM systems, the TLB described above provides hardware support that alleviates the need for software state checks inserted before each load and store to shared information. Effectively, the TLB lookup also does the state check that is required to determine whether shared information is available in the appropriate state. In case the state is not correct, an exception/fault occurs that will eventually lead to executing a software protocol to fetch a copy of the information with the appropriate state.

Also, some of the techniques developed to reduce access control overheads in software may also be useful in systems with hardware support as described above. For example, flag techniques for loads can be used in a hybrid system where access checks for loads are achieved efficiently in software, while the TLB page-state or block-state bits can be used to invoke a trap on a store access fault. Among the above techniques, an extended TLB with two access control state bits (e.g., per 128 bytes) to allow for efficient checks for both loads and stores is the preferred approach for handling access control faults.

Figure 5:
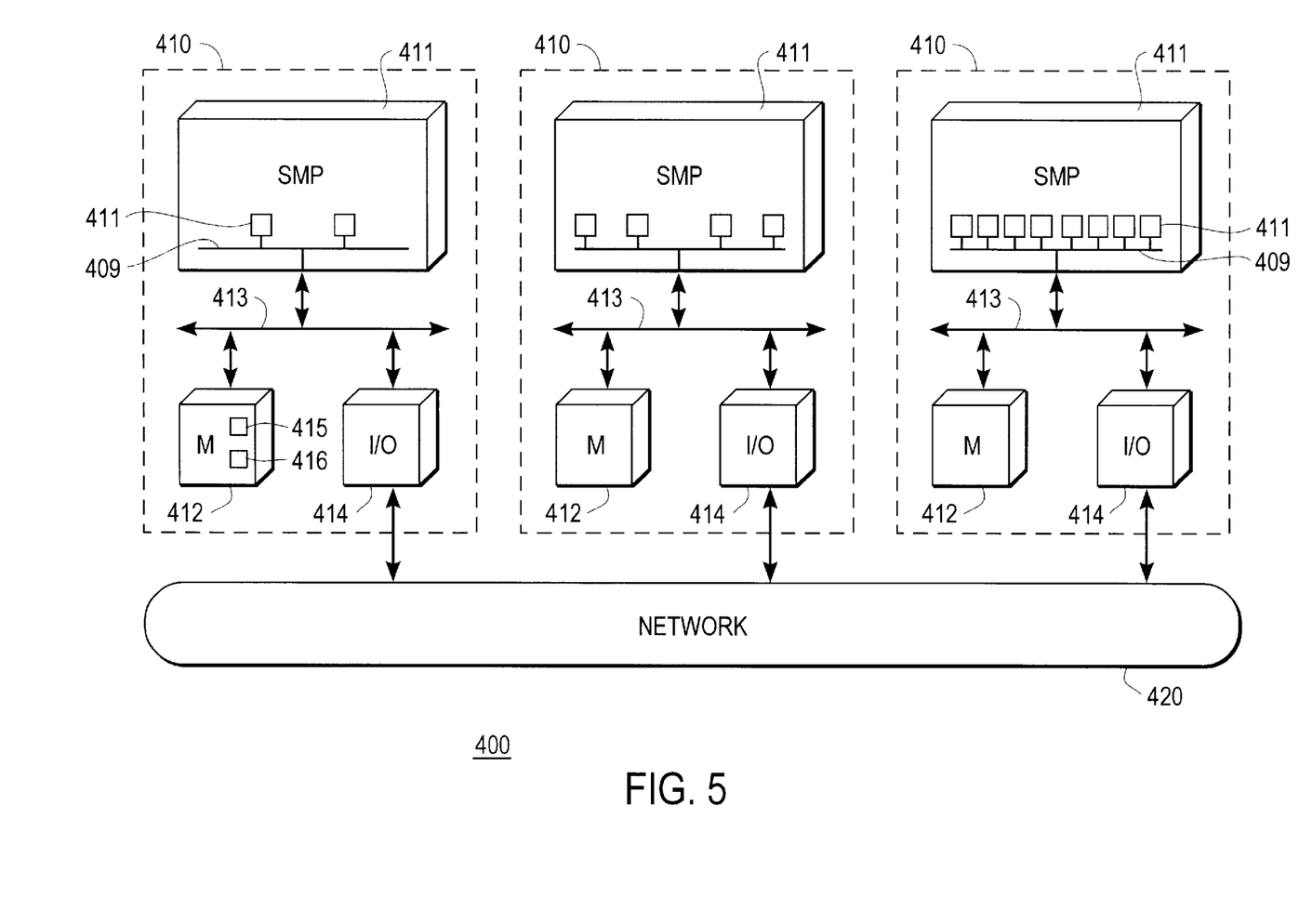
FIG. 5 is a block diagram of a symmetric multi-processor distributed shared memory system according to an alternate embodiment of the present invention.

FIG. 5 shows a symmetric multiprocessor (SMP) distributed shared memory (DSM) computer system 400 according to an alternate embodiment of the invention. Reference numerals in FIG. 5 which are like, similar or identical to reference numerals in FIG. 3 indicate like, similar or identical components. FIG. 5 is shown to illustrate that the above described methods, techniques and hardware support for providing fine-grain memory state checking can also be implemented in a DSM-SMP system 400. For example, TLB 309 of FIG. 3 may be operatively associated with memories 412 or with SMPs 411.

The DSM-SMP system 400 includes a plurality of SMP systems 410 connected to each other by a network 420. Each SMP system 410 includes two, four, eight, or more symmetric processors 411 connected to each other by a processor bus 409. In addition, each SMP 410 can include memories (M) 412 and input/output interfaces (I/O) 414 connected to the symmetric processors 411 by a system bus 413. The memories 412 can be dynamic random access memories (DRAM). The memories 412 may include high-speed hardware caches, such as data caches, instruction caches, page tables, translation lookaside buffers or the like, to take advantage of spatial and temporal localities of data. Frequently used data are more likely to be stored in such caches.

The memories 412 store pages of information, such as instructions or programs 415 and data structures 416. The pages of information are further divided into blocks of information. For example, a page may be 8K bytes of information while a block may be only 128 bytes of information. Some of the addresses of the memories 412 can collectively be designated as a single set of shared virtual addresses. Some of the data structures can include shared data. Shared data can be accessed by any process executing on any of the processors 411 of any of the SMPs 410 using the virtual addresses.

The buses 409 and 413 connect the components of the SMPs 410 using data, address, and control lines. The network 420 uses network protocols for communicating messages among the symmetric multiprocessors 410, for example, asynchronous transfer mode (ATM) or FDDI protocols. Alternatively, the network 420 can be in the form of a high-performance cluster network such as a Memory Channel made by Digital Equipment Corporation.

During operation of the SMP-DSM system 400, instructions of the programs 415 are executed by the processors 411 as execution threads or processes. The instructions can access the data structures 416 using load and store instructions. It is desired that any of the programs 415 executing on any of the processors 411 can access any of the shared data structures 416 stored in any of the memories 412.

Although the invention has been described with a certain degree of particularity, it should be recognized that elements thereof may be altered by persons skilled in the art without departing from the spirit and scope of the invention. Parts of the invention can be implemented as sets of instructions resident in memory 312, 412 of one or more computer systems configured generally as described in FIGS. 3 and 5. Until required by the computer system, the set of instructions may be stored in another computer readable memory, for example in a hard disk drive, or in a removable memory such as an optical disk for eventual use in a CD-ROM drive or a floppy disk for eventual use in a floppy disk drive. Further, the set of instructions can be stored in the memory of another computer and transmitted over a local area network or a wide area network, such as the Internet, when desired by the user. One skilled in the art would appreciate that the physical storage of the sets of instructions physically changes the medium upon which it is stored electrically, magnetically, or chemically so that the medium carries computer readable information. The invention is limited only by the following claims and their equivalents.

In this disclosure, there are shown and described only the preferred embodiments of the invention, but as aforementioned, it is to be understood that the invention is capable of use in various other combinations and environments and is capable of changes or modifications within the scope of the invention as expressed and claimed herein.

We claim:

1. A distributed computer system comprising:
   a first processor associated with a first memory;
   a second processor associated with a second memory;
   the first and second memories each storing a plurality of pages of information, each page having an associated page size; wherein each page of information is divided into at least two blocks;
   a communication bus coupling the first and second processors such that the first and second processors share access to information stored in the first and second memories; and
   first and second translation lookaside buffers coupled to the first and second processors, respectively;
   wherein the first and second processors are configured to issue respective first and second virtual addresses, and the first and second translation lookaside buffers are configured to translate the first and second virtual addresses into physical addresses for accessing information in the first and second memories, respectively;
   each of the first and second translation lookaside buffers comprising:
      a multiplicity of page entries, each page entry specifying for an associated page stored in a respective one of the first and second memories virtual address information, a physical address corresponding to the virtual address information, at least one page status bit and a plurality of block status bits for each block of the associated page; and
      circuitry for resolving virtual memory access requests into physical memory addresses and fault determinations in accordance with the page entries, including the block status bits therein, corresponding to the virtual memory access requests;
   wherein a first page status bit in each page entry indicates whether any of the block status bits in the page entry are active, and the block status bits for each respective block of a page, when active, indicate one of a predefined set of at least three block states for the respective block;
   wherein the at least three block states, represented by a set of block status bits in any one of the page entries in a particular one of the first and second translation lookaside buffers, includes a state indicating whether instructions in a particular block are executable.

2. The distributed computer system of claim 1, wherein a second page status bit indicates whether the page is stored remotely.

3. A distributed computer system comprising:
   a first processor associated with a first memory;
   a second processor associated with a second memory;
   the first and second memories each storing a plurality of pages of information, each page having an associated page size; wherein each page of information is divided into at least two blocks;
   a communication bus coupling the first and second processors such that the first and second processors share access to information stored in the first and second memories; and
   first and second translation lookaside buffers coupled to the first and second processors, respectively;
   wherein the first and second processors are configured to issue respective first and second virtual addresses, and the first and second translation lookaside buffers are configured to translate the first and second virtual addresses into physical addresses for accessing information in the first and second memories, respectively;
   each of the first and second translation lookaside buffers comprising:
      a multiplicity of page entries, each page entry specifying for an associated page stored in a respective one of the first and second memories virtual address information, a physical address corresponding to the virtual address information, at least one page status bit and a plurality of block status bits for each block of the associated page; and
      circuitry for resolving virtual memory access requests into physical memory addresses and fault determinations in accordance with the page entries, including the block status bits therein, corresponding to the virtual memory access requests;
   wherein a first page status bit in each page entry indicates whether any of the block status bits in the page entry are active, and the block status bits for each respective block of a page, when active, indicate one of a predefined set of at least three block states for the respective block;
   wherein the at least three block states, represented by a set of block status bits in any one of the page entries in a particular one of the first and second translation lookaside buffers, includes a first state indicating whether a particular block of information is stored in the memory associated with the processor coupled to the particular translation lookaside buffer, and a second state indicating whether the processor coupled to the particular translation lookaside buffer has read only access to the particular block.

4. The distributed computer system of claim 3, wherein the at least-three block states, represented by a set of block status bits in any one of the page entries in a particular one of the first and second translation lookaside buffers, includes a state indicating whether the processor coupled to the particular translation lookaside buffer has read and write access to the particular block.

5. The distributed computer system of claim 3, wherein the page size is designated dynamically, the plurality of pages including pages having different page sizes, and the size of the respective blocks of each page is proportional to the size of said page.

6. A distributed computer system comprising:
   a first processor associated with a first memory;
   a second processor associated with a second memory;
   the first and second memories each storing a plurality of pages of information, each page having an associated page size; wherein each page of information is divided into at least two blocks;

a communication bus coupling the first and second processors such that the first and second processors share access to information stored in the first and second memories; and first and second translation lookaside buffers coupled to the first and second processors, respectively;

wherein the first and second processors are configured to issue respective first and second virtual addresses, and the first and second translation lookaside buffers are configured to translate the first and second virtual addresses into physical addresses for accessing information in the first and second memories, respectively;

each of the first and second translation lookaside buffers comprising:

a multiplicity of page entries, each page entry specifying for an associated page stored in a respective one of the first and second memories virtual address information, a physical address corresponding to the virtual address information, at least one page status bit and a plurality of block status bits for each block of the associated page; and circuitry for resolving virtual memory access requests into physical memory addresses and fault determinations in accordance with the page entries, including the block status bits therein, corresponding to the virtual memory access requests;

wherein a first page status bit in each page entry indicates whether any of the block status bits in the page entry are active, and the block status bits for each respective block of a page, when active, indicate one of a predefined set of at least three block states for the respective block;

wherein the translation lookaside buffer circuitry is configured to generate a store access fault when a virtual memory access request is not compatible with the block state indicated by the block status bits for a block addressed by the virtual memory access request.

7. A computer system comprising:

a processor associated with a first memory;

the first memory each storing a plurality of pages of information, each page having an associated page size; wherein each page of information is divided into at least two blocks; and a translation lookaside buffer coupled to the processor;

wherein the processor is configured to issue a virtual address, and the translation lookaside buffer is configured to translate the virtual address into a physical address for accessing information in the first memory;

the translation lookaside buffer comprising:

a multiplicity of page entries, each page entry specifying for an associated page stored in the first memory virtual address information, a physical address corresponding to the virtual address information, at least one page status bit and a plurality of block status bits for each block of the associated page; and circuitry for resolving virtual memory access requests into physical memory addresses and fault determinations in accordance with the page entries, including the block status bits therein, corresponding to the virtual memory access requests;

wherein a first page status bit in each page entry indicates whether any of the block status bits in the page entry are active, and the block status bits for each respective block of a page, when active, indicate one of a predefined set of at least three block states for the respective block;

wherein the at least three block states, represented by a set of block status bits in any one of the page entries, includes a state indicating whether instructions in a particular block are executable.

8. The distributed computer system of claim 7, wherein a second page status bit indicates whether the page is stored remotely.

9. A computer system comprising:

a processor associated with a first memory;

the first memory each storing a plurality of pages of information, each page having an associated page size; wherein each page of information is divided into at least two blocks; and a translation lookaside buffer coupled to the processor;

wherein the processor is configured to issue a virtual address, and the translation lookaside buffer is configured to translate the virtual address into a physical address for accessing information in the first memory;

the translation lookaside buffer comprising:

a multiplicity of page entries, each page entry specifying for an associated page stored in the first memory virtual address information, a physical address corresponding to the virtual address information, at least one page status bit and a plurality of block status bits for each block of the associated page; and circuitry for resolving virtual memory access requests into physical memory addresses and fault determinations in accordance with the page entries, including the block status bits therein, corresponding to the virtual memory access requests;

wherein a first page status bit in each page entry indicates whether any of the block status bits in the page entry are active, and the block status bits for each respective block of a page, when active, indicate one of a predefined set of at least three block states for the respective block;

wherein the at least three block states, represented by a set of block status bits in any one of the page entries, includes a first state indicating whether a particular block of information is stored in the first memory, and a second state indicating whether the processor has read only access to the particular block.

10. The computer system of claim 9, wherein the at least three block states, represented by a set of block status bits in any one of the page entries, includes a state indicating whether the processor has read and write access to the particular block.

11. The computer system of claim 9, wherein the page size is designated dynamically, the plurality of pages including pages having different page sizes, and the size of the respective blocks of each page is proportional to the size of said page.

12. A computer system comprising:

a processor associated with a first memory;

the first memory each storing a plurality of pages of information, each page having an associated page size; wherein each page of information is divided into at least two blocks; and a translation lookaside buffer coupled to the processor;

wherein the processor is configured to issue a virtual address, and the translation lookaside buffer is configured to translate the virtual address into a physical address for accessing information in the first memory;

the translation lookaside buffer comprising:

a multiplicity of page entries, each page entry specifying for an associated page stored in the first memory virtual address information, a physical address corresponding to the virtual address information, at least one page status bit and a plurality of block status bits for each block of the associated page; and circuitry for resolving virtual memory access requests into physical memory addresses and fault determinations in accordance with the page entries, including the block status bits therein, corresponding to the virtual memory access requests;

wherein a first page status bit in each page entry indicates whether any of the block status bits in the page entry are active, and the block status bits for each respective block of a page, when active, indicate one of a predefined set of at least three block states for the respective block;

wherein the translation lookaside buffer circuitry is configured to generate a store access fault when a virtual memory access request is not compatible with the block state indicated by the block status bits for a block addressed by the virtual memory access request.

13. A method of operation a computer comprising the steps of:

maintaining a plurality of pages of information divided into at least two blocks of information in a first memory, each page having an associated page size; and maintaining, in a translation lookaside buffer, a multiplicity of page entries, each page entry specifying for an associated page stored in the first memory, virtual address information, a physical address corresponding to the virtual address information, at least one page status bit and a plurality of block-status bits for each block of the associated page;

using dedicated circuitry for resolving virtual memory access requests issued by the computer into physical memory addresses and fault determinations in accordance with the page entries corresponding to the virtual memory access requests, each fault determination being made in accordance with the at least one page status bit and block status bits of the corresponding page entry; and accessing the first memory at the physical memory addresses produced by the resolving;

wherein the at least one page status bit in each page entry indicates whether any of the block state bits in the page entry are active, and the block status bits for each respective block of a page, when active, indicate one of a predefined set of at least three block states for the respective block;

wherein the at least three block states, represented by a set of block status bits in any one of the page entries in a particular one of the first and second translation lookaside buffers, includes a state indicating whether instructions in a particular block are executable.

14. A method of operation a computer comprising the steps of:

maintaining a plurality of pages of information divided into at least two blocks of information in a first memory, each page having an associated page size; and maintaining, in a translation lookaside buffer, a multiplicity of page entries, each page entry specifying for an associated page stored in the first memory, virtual address information, a physical address corresponding to the virtual address information, at least one page status bit and a plurality of block status bits for each block of the associated page;

using dedicated circuitry for resolving virtual memory access requests issued by the computer into physical memory addresses and fault determinations in accordance with the page entries corresponding to the virtual memory access requests, each fault determination being made in accordance with the at least one page status bit and block status bits of the corresponding page entry; and accessing the first memory at the physical memory addresses produced by the resolving;

wherein the at least one page status bit in each page entry indicates whether any of the block state bits in the page entry are active, and the block status bits for each respective block of a page, when active, indicate one of a predefined set of at least three block states for the respective block;

wherein the at least three block states, represented by a set of block status bits in any one of the page entries, includes a first state indicating whether a particular block of information is stored in the first memory, and a second state indicating whether the processor has read only access to the particular block.

15. The method of claim 14, wherein the at least three block states, represented by a set of block status bits in any one of the page entries, includes a state indicating whether the processor has read and write access to the particular block.

16. The method of claim 14, wherein the page size is designated dynamically, the plurality of pages including pages having different page sizes, and the size of the respective blocks of each page is proportional to the size of said page.

17. A method of operation a computer comprising the steps of:

maintaining a plurality of pages of information divided into at least two blocks of information in a first memory, each page having an associated page size; and maintaining, in a translation lookaside buffer, a multiplicity of page entries, each page entry specifying for an associated page stored in the first memory, virtual address information, a physical address corresponding to the virtual address information, at least one page status bit and a plurality of block status bits for each block of the associated page;

using dedicated circuitry for resolving virtual memory access requests issued by the computer into physical memory addresses and fault determinations in accordance with the page entries corresponding to the virtual memory access requests, each fault determination being made in accordance with the at least one page status bit and block status bits of the corresponding page entry; and accessing the first memory at the physical memory addresses produced by the resolving;

wherein the at least one page status bit in each page entry indicates whether any of the block state bits in the page entry are active, and the block status bits for each respective block of a page, when active, indicate one of a predefined set of at least three block states for the respective block;

wherein the resolving step includes generating a store access fault when a virtual memory access request is not compatible with the block state indicated by the block status bits for a block addressed by the virtual memory access request.

* * * * *

UNITED STATES PATENT AND TRADEMARK OFFICE
CERTIFICATE OF CORRECTION

PATENT NO. : 6,412,056 B1
DATED : June 25, 2002
INVENTOR(S) : Gharachorloo et al.

It is certified that error appears in the above-identified patent and that said Letters Patent is hereby corrected as shown below:

<u>Title page,</u>
Item [73], please replace Assignee with -- Compaq Information Technologies Group, L.P. --

Signed and Sealed this

Twelfth Day of November, 2002

*Attest:*

*Attesting Officer*

JAMES E. ROGAN
*Director of the United States Patent and Trademark Office*